Aug. 31, 1926.

A. L. ALAJ 1,598,409

FOOD PROTECTING DEVICE

Filed Jan. 30, 1926    2 Sheets-Sheet 1

INVENTOR.
Antoine L. Alaj,
BY
Geo. P. Kimmel
ATTORNEY.

Aug. 31, 1926.  
A. L. ALAJ  
1,598,409  
FOOD PROTECTING DEVICE  
Filed Jan. 30, 1926   2 Sheets-Sheet 2

INVENTOR.  
*Antoine L. Alaj,*  
BY  
ATTORNEY.

Patented Aug. 31, 1926.

1,598,409

UNITED STATES PATENT OFFICE.

ANTOINE L. ALAJ, OF CHICAGO, ILLINOIS.

FOOD-PROTECTING DEVICE.

Application filed January 30, 1926. Serial No. 85,011.

This invention relates to a protecting device or food, and has for its object to provide, in a manner as hereinafter set forth, a device of such class for enclosing an article of food upon a plate to prevent the dissipation of the heat or moisture thereof when transporting the food from the kitchen to the place for serving, under such conditions maintaining the food in substantially its originally prepared or cooked condition.

A further object of the invention is to provide, in a manner as hereinafter set forth, a food protecting device for the purpose referred to and which is so constructed to enable a series of such devices being arranged in superposed relation with respect to a series of spaced superposed food carrying plates whereby the plates and devices can be transported, in stacked position, at one time by a waiter for serving a plurality of diners with the food in its substantially original cooked or prepared condition, under such circumstances an expeditious service is provided whereby a great saving in time is had and delay to the diners is overcome. The device being so constructed that when serving one of the several diners, it is readily removed from the plate with which it is associated and supported upon the arm of the waiter.

Further objects of the invention are to provide, in a manner as hereinafter set forth, a food protecting device, which is simple in its construction and arrangement, strong, durable, compact, provided with means to prevent the dissipation of the heat or moisture from the food when the device is in enclosing or protecting position with respect to the food upon a food carrying plate, thoroughly efficient in its use, conveniently mounted with respect to the food carrying plate, and inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
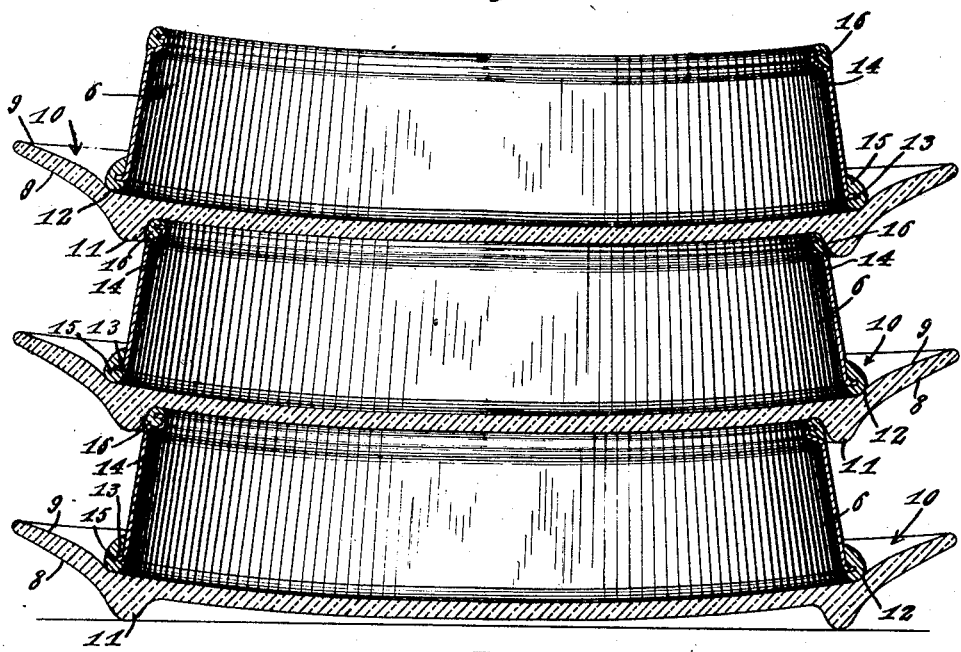
Figure 1 is a vertical sectional view, illustrating a plurality of food protecting devices in accordance with this invention, arranged in superposed relation with respect to a series of superposed food carrying plates.
Figure 2:
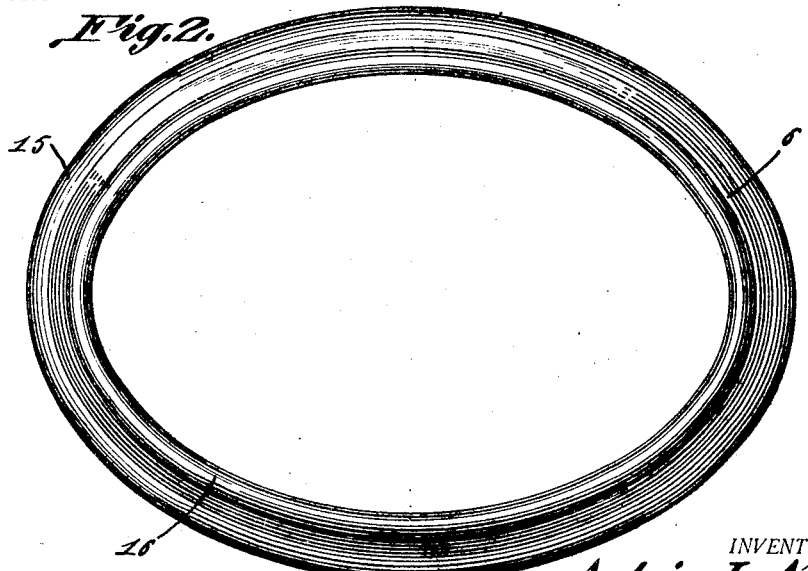
Figure 2 is a top plan view illustrating the device upon a food carrying plate.
Figure 3:
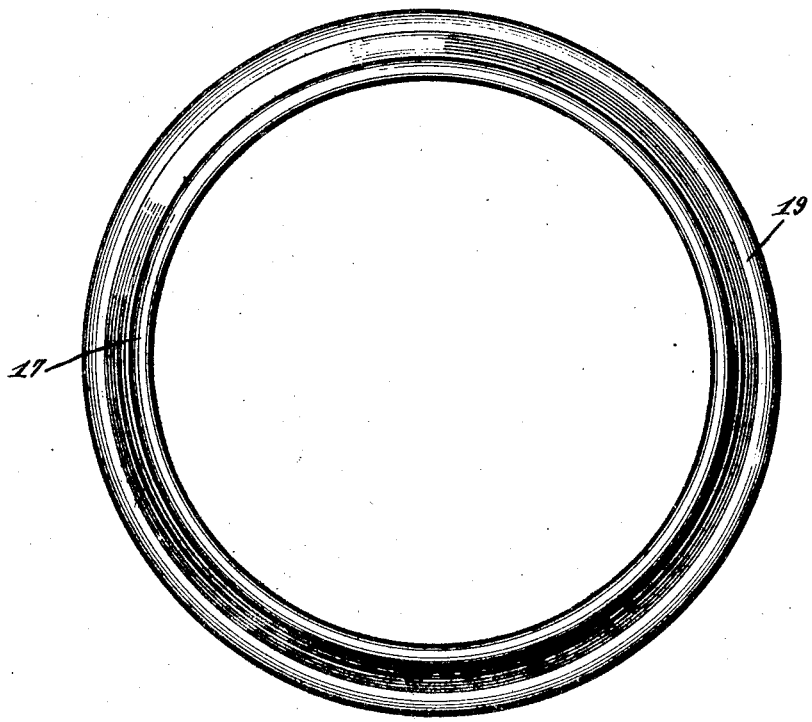
Figure 3 is a top plan view of a modified form.
Figure 4:
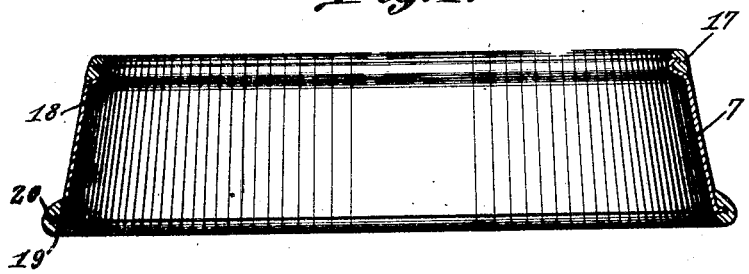
Figure 4 is a cross sectional view of the form shown in Figure 3.

A food protecting device, in accordance with this invention, in either form shown, comprises a tapered body portion of band like form constructed from any suitable material, preferably metallic of any desirable gauge. In Figures 1 and 2 the body portion is indicated at 6 and in Figures 3 and 4 at 7.

The body portion 6 has its bottom edge throughout upon a convex curvature and its top edge upon a concave curvature so as to conform to the curvature of the upper face 8 and the lower face 9, of a food supporting or carrying plate 10. The plate 10 is of known construction and has its lower face 9 formed with a depending rib 11, against the inner face of which abuts the top edge of the body portion 6. The upper face 8 of the plate 10 is formed with a continuous shoulder 12 against which the bottom edge of the body portion 6 abuts when the latter is in protecting position with respect to the food carried by the plate 10.

The body portion 6 is of oval contour and is formed at its bottom with an outwardly extending angularly disposed flange 13 extending completely around said body portion. The top of the body portion 6 is inset to form a substantially U-shaped flange 14. Secured to the body portion 6, by the flange 13, is a resilient sealing member 15 which is coextensive with the bottom of said body portion 6. The member 15 has the flange 13 embedded therein and said member 15 engages the outer periphery of the body portion 6 above the flange 13 and further engages the bottom edge of said body portion 6 and said member 15 is flush with the inner face of the body portion 6 and also depends below the bottom edge thereof. The flange 14 provides means for connecting a resilient combined sealing and protecting member 16 to the top of the body portion 6 and said member 16 is coextensive with the top of the body portion 6 and extends into, as well as overlaps the upper portion of the flange 14 and said member 16 is flush with the inner face of said flange 14. The member 16 extends upon the outer periphery of the body portion 6 slightly below the point of joinder of the flange 14 with said body portion. The members 15 and 16 provide means for sealing the top and bottom of the body portion 6, when the latter is arranged between a pair of plates 10, and the sealing action prevents the dissipation of the heat or moisture from the food which is mounted on the plate 10, under such conditions the food is served in substantially its original cooked or prepared condition.

The body portion 7 is in the form of an annulus of circular contour, flat at its top and bottom, that is to say it does not have a convex lower edge or concave upper edge as the body portion 6 is provided. The body portion 7 is employed in connection with flat carrying plates, as well as for plates of circular contour. The top of the body portion 7 is provided with a combined sealing and protecting member 17 of resilient material and which is secured in position by a flange 18 which is of the same construction and arrangement as the flange 14 referred to with respect to the body portion 6. Secured to the bottom of the body portion 7 is a resilient sealing member 19 and which is secured in position by a flange 20 of the same construction and arrangement as referred to in connection with the flange 13 of the body portion 6. The members 17 and 19 are coextensive with the edges of the body portion and are set up with respect thereto and in the same manner as that referred to in connection with the members 15 and 16 carried by the body portion 6.

It is thought the many advantages of a food protecting device, in accordance with this invention, can be readily understood, and although the preferred construction of the device is as illustrated and described, yet changes in the details of construction can be had which will fall within the scope of the invention as claimed.

What I claim is:—

1. A food protecting device comprising a body portion of band like form having an inset portion at its top to provide a flange and an outwardly extending portion at its bottom to provide a flange, a resilient sealing member at the top and bottom of said body portion secured therewith by said flanges, said members enclosing said flanges, and extending above and depending below the top and bottom of said body portion respectively.

2. A food protecting device comprising a body portion of band like form having an inset portion at its top to provide a flange and an outwardly extending portion at its bottom to provide a flange, a resilient sealing member at the top and bottom of said body portion secured therewith by said flanges, said members enclosing said flanges, said body portion being tapered throughout.

3. A food protecting device comprising a body portion of band like form having an inset portion at its top to provide a flange and an outwardly extending portion at its bottom to provide a flange, a resilient sealing member at the top and bottom of said body portion secured therewith by said flanges, said members enclosing said flanges, and extended above and below the top and bottom of said body portion, said body portion being tapered throughout.

In testimony whereof, I affix my signature hereto.

ANTOINE L. ALAJ.